United States Patent [19]

Inoue

[11] Patent Number: 4,914,914
[45] Date of Patent: Apr. 10, 1990

[54] HYDROSTATICALLY OPERATED CONTINUOUSLY VARIABLE TRANSMISSION

[75] Inventor: Kazuo Inoue, Tokyo, Japan

[73] Assignee: Honda Giken Kogyo Kabushiki Kaisha, Tokyo, Japan

[21] Appl. No.: 202,105

[22] Filed: Jun. 3, 1988

[30] Foreign Application Priority Data

Jun. 3, 1987 [JP] Japan ................... 62-139562

[51] Int. Cl.$^4$ .......................................... F16D 39/00
[52] U.S. Cl. ....................................... 60/489; 60/487; 91/497
[58] Field of Search .............................. 60/487–492; 91/497, 498

[56] References Cited

U.S. PATENT DOCUMENTS

| | | |
|---|---|---|
| 1,533,399 | 4/1925 | Dunlap . |
| 1,695,289 | 12/1928 | Lee ........................ 60/489 |
| 1,914,622 | 6/1933 | Smith ................... 60/489 X |
| 2,099,630 | 11/1937 | Schneider .............. 60/489 |
| 2,502,546 | 4/1950 | Adams .............. 417/222 X |
| 2,683,421 | 7/1954 | Woydt . |
| 2,844,002 | 7/1958 | Pavesi ................. 60/487 X |
| 3,084,633 | 4/1963 | Henrichsen . |
| 3,295,459 | 1/1967 | Griffith . |
| 3,521,449 | 7/1970 | Speggiorin ............. 60/488 |
| 3,765,183 | 10/1973 | Baurle ................ 91/497 X |
| 4,735,050 | 4/1988 | Hayashi . |
| 4,741,251 | 5/1988 | Hayashi . |
| 4,745,748 | 5/1988 | Hayashi . |
| 4,748,898 | 6/1988 | Hayashi . |
| 4,781,022 | 11/1988 | Hayashi et al. . |

FOREIGN PATENT DOCUMENTS

| | | |
|---|---|---|
| 23390 | 7/1935 | Australia . |
| 0186500 | 12/1986 | European Pat. Off. . |
| 1625039 | 2/1967 | Fed. Rep. of Germany . |
| 61-153057 | 7/1986 | Japan . |
| 574991 | 1/1946 | United Kingdom . |
| 1282094 | 7/1972 | United Kingdom . |

Primary Examiner—Edward K. Look
Attorney, Agent, or Firm—Lyon & Lyon

[57] ABSTRACT

A hydrostatically operated continuously variable transmission has a hydraulic pump and a hydraulic motor which are interconnected by a closed hydraulic circuit. The hydraulic pump comprises a plurality of pump plungers reciprocably disposed radially in a cylinder block, and an eccentric pump ring engaging outer ends of the pump plungers and supported eccentrically with respect to the center of rotation of a cylinder block for imparting reciprocating movement to the pump plungers in response to rotation of the cylinder block. The hydraulic motor comprises a plurality of motor plungers reciprocably disposed radially in the cylinder block, and an eccentric motor ring engaging outer ends of the motor plungers and supported eccentrically with respect to the center of rotation of the cylinder block for imparting reciprocating movement to the motor plungers in response to relative rotation between the cylinder block and an output shaft. At least one of the eccentric rings is supported in a manner for being eccentrically displaced from the center of rotation of the cylinder block by a variable amount of eccentricity.

11 Claims, 9 Drawing Sheets

HYDROSTATICALLY OPERATED CONTINUOUSLY VARIABLE TRANSMISSION

BACKGROUND OF THE INVENTION

The present invention relates to a hydrostatically operated continuously variable transmission including a hydraulic pump connected to an input shaft and a hydraulic motor connected to an output shaft, the hydraulic pump and the hydraulic motor being coupled in a closed hydraulic circuit.

As disclosed in Japanese Laid-Open Patent Publication No. 61-153057, for example, a hydrostatically operated continuously variable transmission of the type described above has a rotatable cylinder block housing a hydraulic pump and a hydraulic motor. Each of the hydraulic pump and the hydraulic motor comprises an annular array of reciprocable plungers disposed in the cylinder block parallel to the axis of the cylinder block, and a swash plate engaging the outer ends of the plungers and held in an inclined position with respect to the axis of the cylinder block for imparting reciprocating movement to the plungers in response to rotation of the cylinder block.

In the above continuously variable transmission, the plungers of the hydraulic pump and those of the hydraulic motor must be arranged axially of the cylinder block. Therefore, the cylinder block which accommodates these plungers must be axially elongate. The swash plates of the hydraulic pump and the hydraulic motor also have to be positioned close to each other in the cylinder block in the axial direction thereof. These design limitations make it difficult to reduce the axial length of the transmission.

SUMMARY OF THE INVENTION

In view of the aforesaid drawbacks, it is an object of the present invention to provide a hydrostatically operated continuously variable transmission which is of an axial length that is much smaller than that of conventional hydrostatically operated continuously variable transmissions.

According to the present invention, there is provided a hydrostatically operated continuously variable transmission comprising a fixed casing, an input shaft rotatably supported in the casing, a hydraulic pump coupled to the input shaft, an output shaft rotatably supported in the casing, a hydraulic motor coupled to the output shaft, a cylinder block rotatable with one of the input and output shafts, and a closed hydraulic circuit disposed in the cylinder block and interconnecting the hydraulic motor and the hydraulic pump, one of the hydraulic pump and the hydraulic motor comprising a plurality of first plungers reciprocably disposed radially in the cylinder block, and a first eccentric ring engaging outer ends of the first plungers and supported in the casing eccentrically with respect to the center of rotation of the cylinder block for imparting reciprocating movement to the first plungers in response to rotation of the cylinder block, the other of the hydraulic pump and the hydraulic motor comprising a plurality of second plungers reciprocably disposed radially in the cylinder block, and a second eccentric ring engaging outer ends of the second plungers and supported relatively rotatably on the other of the input and output shafts eccentrically with respect to the center of rotation of the cylinder block for imparting reciprocating movement to the second plungers in response to relative rotation between the cylinder block and said other of the input and output shafts, at least one of the first and second eccentric rings being eccentrically displaced from the center of rotation of the cylinder block by a variable amount of eccentricity.

Since the plungers of the hydraulic pump and the hydraulic motor are radially arranged, the cylinder block which accommodates these plungers may be of a small axial length.

Furthermore, inasmuch as the first and second eccentric rings are disposed in surrounding relation to the cylinder block, any portions of the first and second eccentric rings which are axially adjacent to the cylinder block are limited or minimized.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
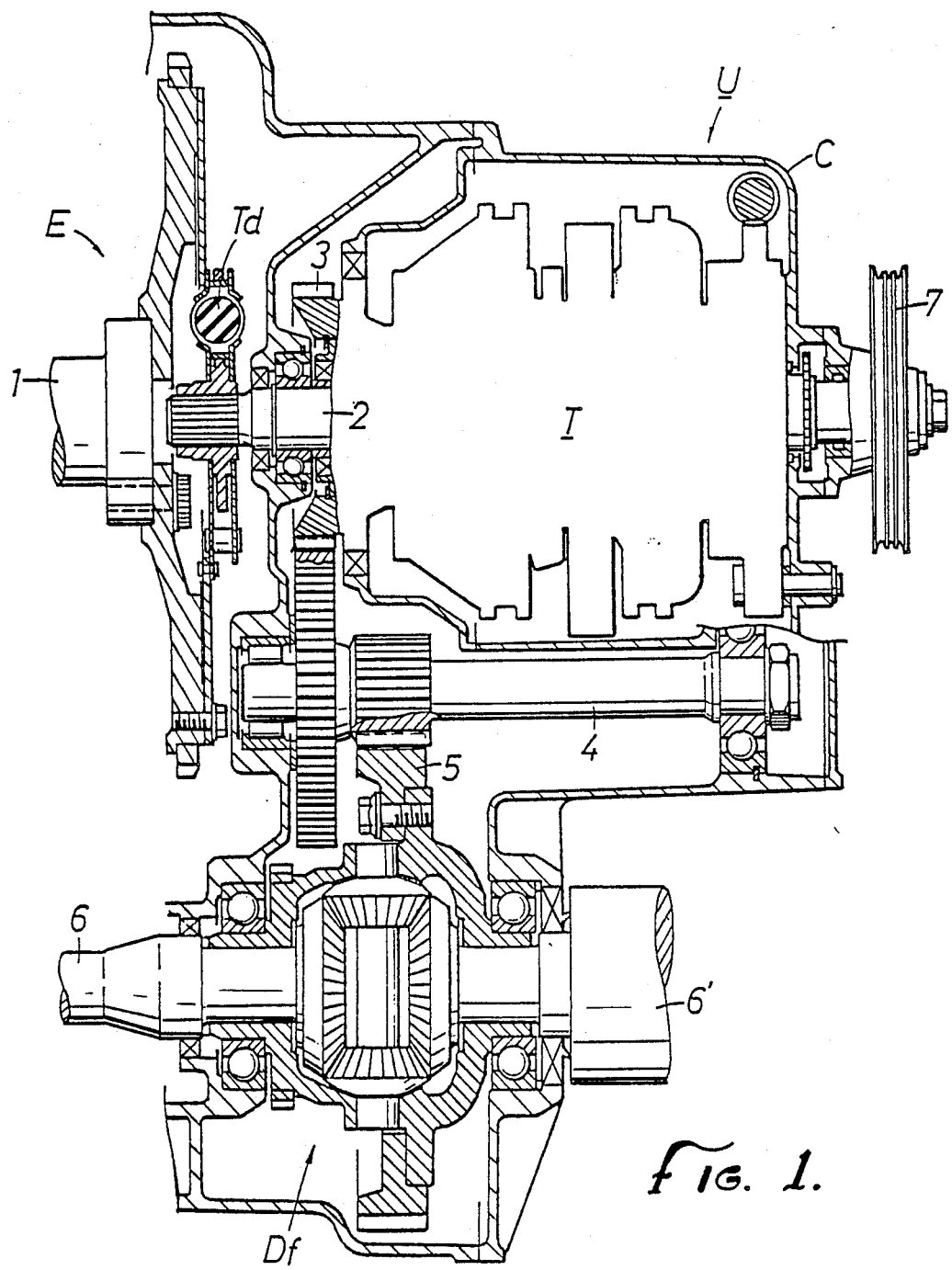
FIG. 1 is a cross-sectional view of an automotive power unit incorporating a hydrostatically operated continuously variable transmission according to the present invention.

As shown in FIG. 1, an automotive power unit U generally comprises an engine E, a hydrostatically operated continuously variable transmission T according to the present invention, and a differential Df which are all housed and supported in a casing C.

The engine E has a crankshaft 1, and the continuously variable transmission T positioned at the righthand (FIG. 1) end of the engine E has an input shaft 2 disposed coaxially with the crankshaft 1 and coupled thereto through a torque damper Td. The continuously variable transmission T has an output gear 3 located close to the engine E and operatively meshing with a ring gear 5 of the differential Df through a speed reducer gear shaft 4. The differential Df has axially opposite output shafts 6, 6' parallel to the crankshaft 1 and the input shaft 2 for driving respective road wheel axles (not shown).

The input shaft 2 has a righthand end projecting out of the casing C and supporting a pulley 7 thereon for driving various accessories such as a power steering hydraulic pump, an air conditioning compressor, and the like.

Figure 2:
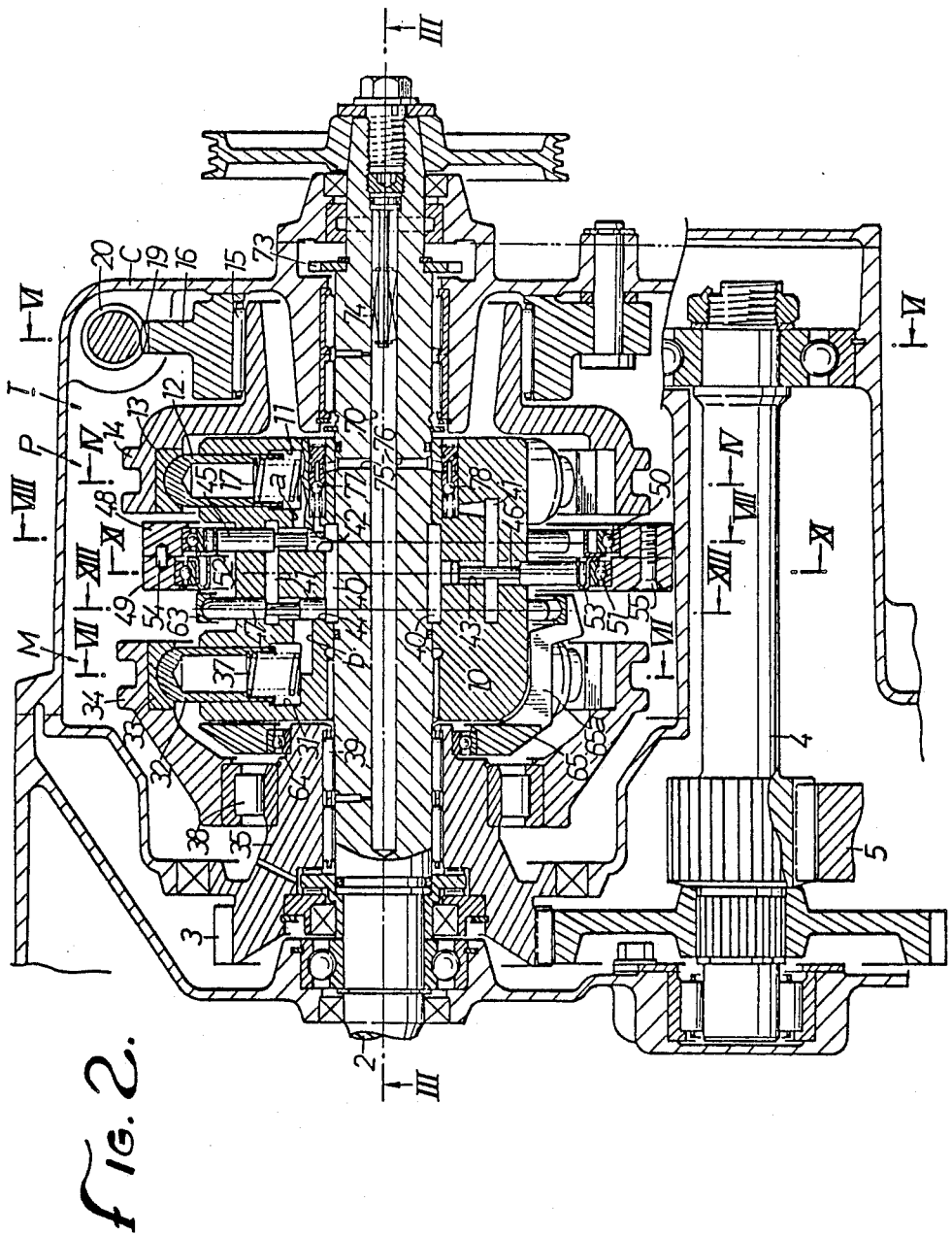
FIG. 2 is a longitudinal cross-sectional view of the hydrostatically operated continuously variable transmission shown in FIG. 1.
Figure 3:
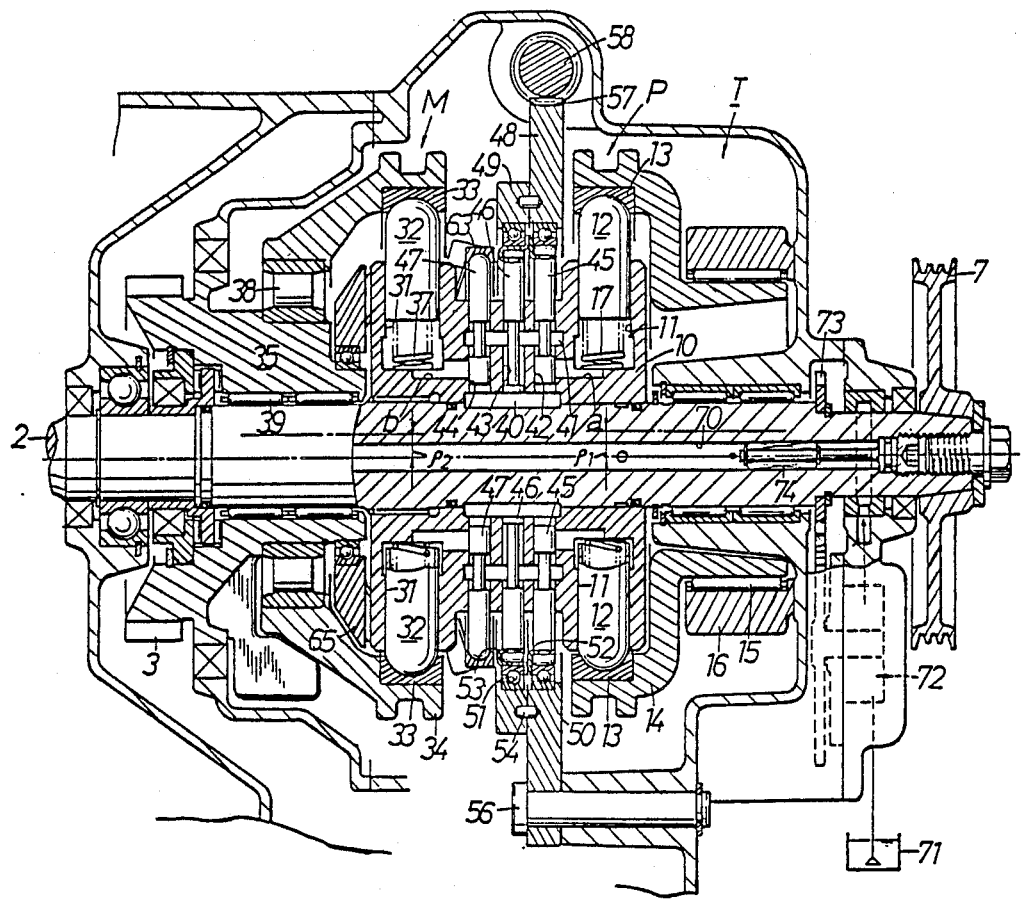
FIG. 3 is a cross-sectional view taken along line III—III of FIG. 2.

As shown in FIGS. 2 and 3, the continuously variable transmission T generally comprises a hydraulic pump P of the variable displacement type and a hydraulic motor M of the fixed displacement type.

Figure 4:
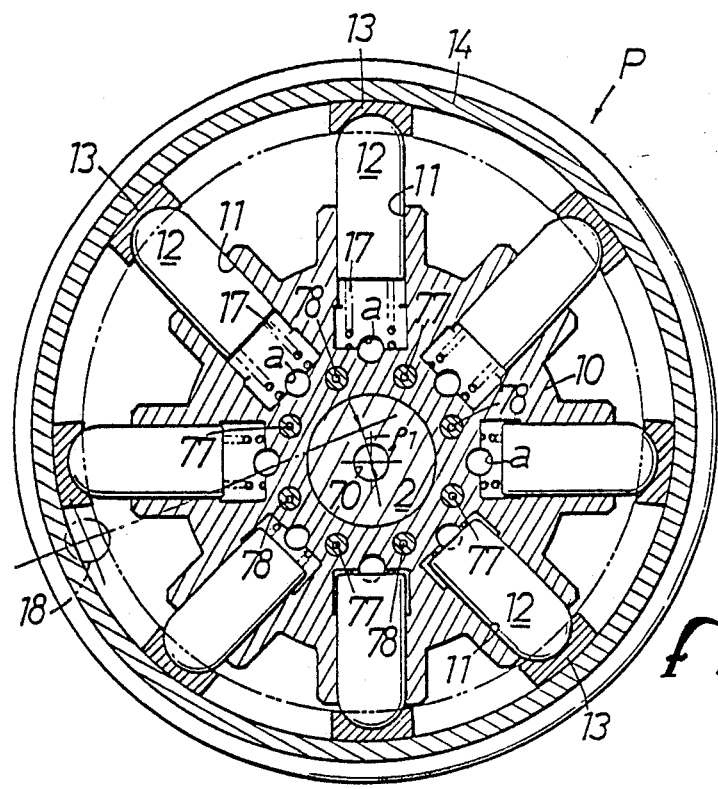
FIG. 4 is a cross-sectional view taken along line IV—IV of FIG. 2.

The hydraulic pump P comprises a cylindrical cylinder block 10 fixedly fitted over the input shaft 2 through splines and having a number of radial cylinder bores or holes 11 defined in a righthand end of the cylinder block 10, a number of pump plungers 12 (see FIG. 4) slidably disposed in the cylinder holes 11, respectively, an eccentric pump ring 14 (i.e., a first eccentric ring) against which the radially outer ends of the pump plungers 12 are slidably held through respective shoes 13, and a transmission ratio control ring 16 by which the eccentric pump ring 14 is rotatably supported through a needle bearing 15. Springs 17 are disposed respectively in the cylinder holes 11 for normally urging the pump plungers 12, respectively, toward the eccentric pump ring 14.

Figure 6:
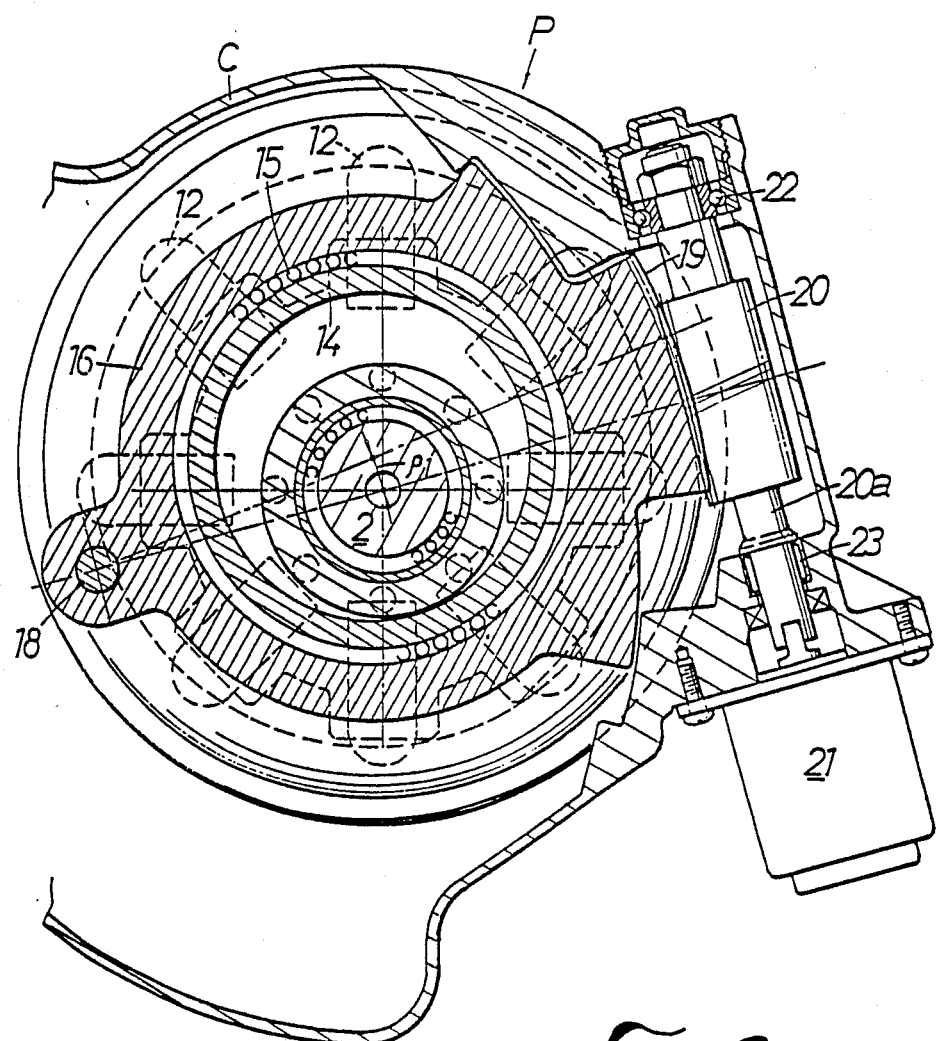
FIG. 6 is a cross-sectional view taken along line VI—VI of FIG. 2.

The transmission ratio control ring 16 is rockably supported in the casing C through a pivot shaft 18. The transmission ratio control ring 16 has a sector gear 19 on its rockably movable end. As illustrated in FIG. 6, the sector gear 19 is held in mesh with a worm gear 20 having a shaft 20a coaxially coupled to the drive shaft of a first stepping motor 21. The shaft 20a of the worm gear 20 is supported on the casing C by means of a ball bearing 22 and a needle bearing 23. The first stepping motor 21 is mounted on an outer side surface of the casing C.

When the first stepping motor 21 is rotated in one direction or the other to cause the worm gear 20 to drive the sector gear 19, the transmission ratio control ring 16 moves the eccentric pump ring 14 through a position concentric with the center of rotation of the cylinder block 10 between an eccentric position on one side of that concentric position and another eccentric position on the other side of the concentric position. When the cylinder block 10 is rotated about its own axis or center at the time the eccentric pump ring 14 assumes the position which is displaced $\rho 1$ off the center of rotation of the cylinder block 10, the pump plungers 12 are enabled by the eccentric pump ring 14 to reciprocally move a stroke which is twice the amount of eccentricity $\rho 1$ for repeating their suction and discharge strokes. Therefore, by controlling the amount of eccentricity of the eccentric pump ring 14 through rocking movement of the transmission ratio control ring 16, the strokes of the respective pump plungers 12, i.e., the displacement of the hydraulic pump P can freely be controlled.

Figure 7:
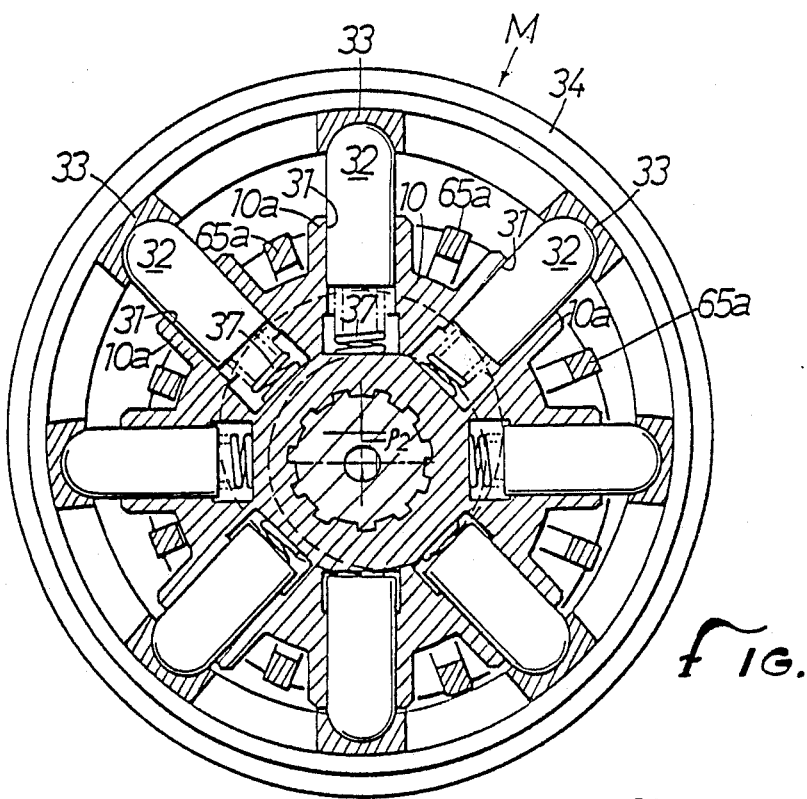
FIG. 7 is a cross-sectional view taken along line VII—VII of FIG. 2.

Referring back to FIGS. 2 and 3, the hydraulic motor M comprises the cylindrical cylinder block 10 having a number of radial cylinder bores or holes 31 (see FIG. 7) defined in a lefthand end of the cylinder block 10, a number of motor plungers 32 slidably disposed in the cylinder holes 31, respectively, an eccentric motor ring 34 (i.e., a second eccentric ring) against which the radially outer ends of the motor plungers 12 are slidably held through respective shoes 33, and an output shaft 35 by which the eccentric motor ring 34 is rotatably supported through a roller bearing 38 and which is supported on the input shaft 2 by needle bearings 39. Springs 37 are disposed respectively in the cylinder holes 31 for normally urging the motor plungers 32, respectively, toward the eccentric motor ring 34. The output gear 3 is formed on the outer end of the output shaft 35.

The eccentric motor ring 34 is held by the output shaft 35 in a position which is displaced $\rho 2$ off the center of rotation of the cylinder block 10. When the cylinder block 10 and the output shaft 35 are rotated with respect to each other, the motor plungers 32 are enabled by the eccentric motor ring 34 to reciprocally move a stroke which is twice the amount of eccentricity $\rho 2$ for repeating their expansion and contraction strokes.

A closed hydraulic circuit is established between the hydraulic pump P and the hydraulic motor M as follows:

The cylinder block 10 has an intermediate portion sandwiched between the group of cylinder holes 11 and the group of cylinder holes 31. The intermediate portion has defined therein an annular inner oil chamber 40, an annular outer oil chamber 41 concentrically surrounding the annular inner oil chamber 40, and a number of first valve holes 42, second valve holes 43, and third valve holes 44 extending radially through the partition between the oil chambers 40, 41 and the outer peripheral wall of the outer oil chamber 41. The first valve holes 42 are positioned adjacent to the cylinder holes 11 of the hydraulic pump P and held in communication with these cylinder holes 11 through pump ports a. The third valve holes 44 are positioned adjacent to the cylinder holes 31 of the hydraulic motor M and held in communication with these cylinder holes 31 through motor ports b. The second valve holes 43 are disposed between the first valve holes 42 and the third valve holes 44.

Figure 8:
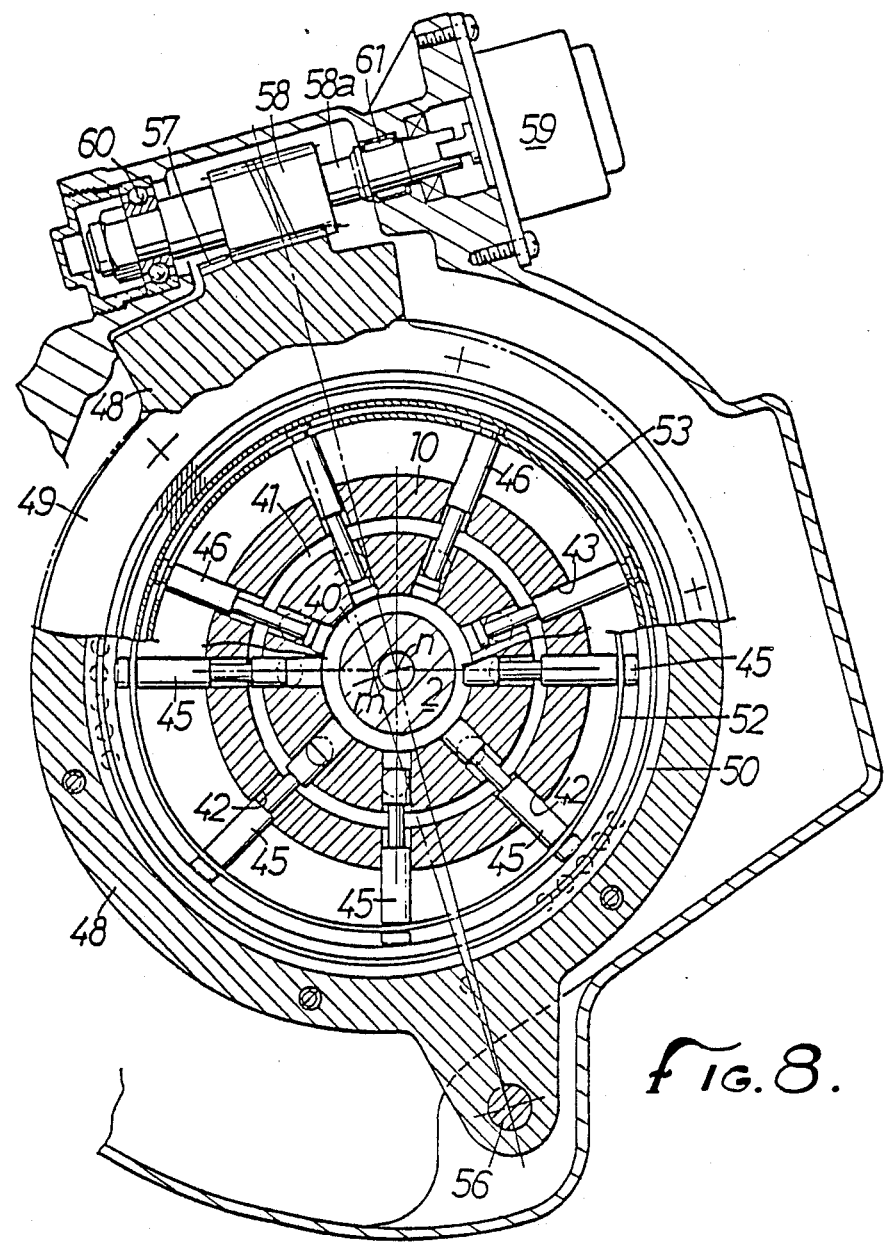
FIG. 8 is a cross-sectional view taken along line VIII—VIII of FIG. 2.

As illustrated in FIGS. 2 and 8, first spool-type distribution valves 45, spool-type clutch valves 46, and second spool-type distribution valves 47 are slidably fitted respectively in the first valve holes 42, the second valve holes 43, and the third valve holes 44. A first valve control ring 48 surrounding the first distribution valves 45 engages the radially outer ends of the first distribution valves 45 through a ball bearing 50. A second valve control ring 49 surrounding the clutch valves 46 engages the radially outer ends of the clutch valves 46 through a ball bearing 51. To forcibly retain the first valve control ring 48 in engagement with the outer ends of the first distribution valves 45, the outer ends of the first distribution valves 45 are interconnected by a first retainer ring 52 concentric with the first valve control ring 48. Similarly, to forcibly retain the second valve control ring 49 in engagement with the outer ends of the clutch valves 46, the outer ends of the clutch valves 46 are interconnected by a second retainer ring 53 concentric with the second valve control ring 49.

The first and second valve control rings 48, 49 are firmly joined to each other by means of knock pins 54 and bolts 55 (see FIG. 2). One of these valve control rings 48, 49, e.g., the first valve control ring 48 in the illustrated embodiment, is rockably supported in the casing C by a pivot shaft 56 (see FIG. 3) extending parallel to the input shaft 2. As also shown in FIG. 8, the first valve control ring 48 has on its rockable end a sector gear 57 meshing with a worm gear 58 having a shaft 58a coupled coaxially to the drive shaft of a second stepping motor 59. The shaft 58a of the worm gear 58 is supported on the casing C by means of a ball bearing 60 and a needle bearing 61. The second stepping motor 59 is mounted on an outer side surface of the casing C.

When the second stepping motor 59 is rotated in one direction or the other to cause the worm gear 58 to drive the sector gear 57, the first valve control ring 48 is casused to rock from a position concentric with the center of rotation of the cylinder block 10 to an eccentric position displaced off the concentric position in a direction which is angularly spaced about 90° from the direction in which the eccentric pump ring 14 is eccentrically displaced.

Figure 9:
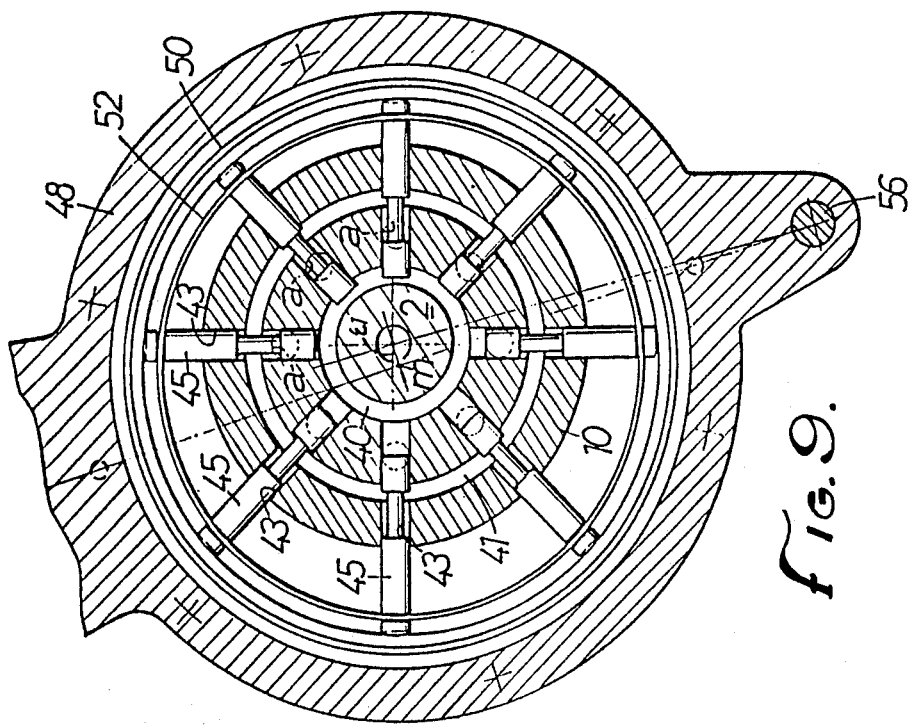
FIG. 9 is a cross-sectional view similar to FIG. 8 showing a group of first distribution valves when a first valve control ring is in a hydraulic pressure transmitting position.

As illustrated in FIG. 9, when the cylinder block 10 is rotated about its own axis or center at the time the first valve control ring 48 is held in a hydraulic pressure transmitting position m which is displaced $\epsilon 1$ off the center of rotation of the cylinder block 10, the first distribution valves 45 are enabled by the first valve control ring 48 to reciprocally move a stroke which is twice the amount of eccentricity $\epsilon 1$, between radially inner and outer positions within the cylinder block 10. While the first distribution valves 45 are being moved near their inner positions, they allow communication between the pump ports a corresponding to the pump plungers 12 in the discharge stroke and the outer oil chamber 41 for thereby introducing working oil discharged from the cylinder holes 11 housing these pump plungers 12 into the outer oil chamber 41. While the first distribution valves 45 are being moved near their outer positions, they allow communication between the pump ports a corresponding to the pump plungers 12 in the suction stroke and the inner oil chamber 40 for thereby introducing working oil from the inner oil chamber 40 into the cylinder holes 11 housing these pump plungers 12.

Figure 10:
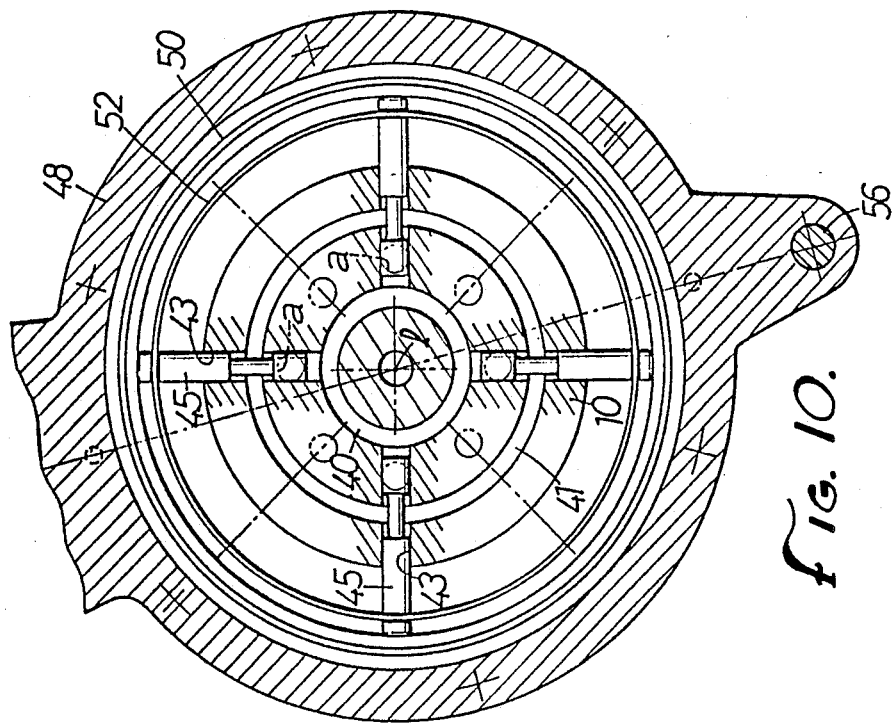
FIG. 10 is a cross-sectional view similar to FIGS. 8 and 9 showing a group of first distribution valves when a first valve control ring is in a hydraulic lockup position.

As shown in FIG. 10, when the first valve control ring 48 is held in a lockup position l concentric with the cylinder block 10, all of the first distribution valves 45 remain in a neutral position irrespective of rotation of the cylinder block 10, thus closing all of the pump ports a.

Figure 11:
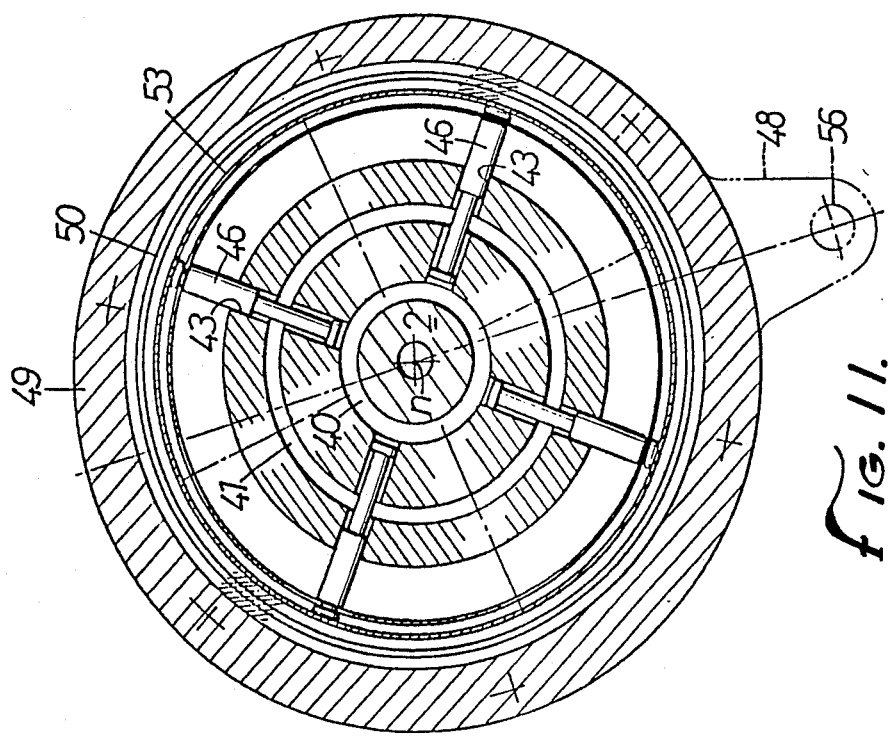
FIG. 11 is a cross-sectional view taken along line XI—XI of FIG. 2, showing a group of clutch valves when a second valve control ring is in a clutch-on position.

The second valve control ring 49 coupled to the first valve control ring 48 assumes a clutch-on position n (see FIG. 11) concentric with the cylinder block 10 when the first valve control ring 48 is in the hydraulic pressure transmitting position m. The clutch valves 46 are enabled by the second valve control ring 49 to be held in a position in which communication between the inner and outer oil chambers 40, 41 is shut off. By increasing the amount of eccentricity of the first valve control ring 48 more than $\epsilon 1$ to shift the second control ring 49 into a clutch-off position f (FIG. 12) which is displaced $\epsilon 2$ off the center of rotation of the cylinder block 10, the clutch valves 46 can be reciprocally moved between radially inner and outer positions within the cylinder block 10 by the second valve control ring 49 in response to rotation of the cylinder block 10. When the clutch valves 46 reach the inner position, they permit communication between the inner and outer oil chambers 40, 41.

In FIGS. 2 and 3, a third valve control ring 63 engages the outer ends of the second distribution valves 47 in surrounding relation thereto. The third valve control ring 63 is supported on a plurality of legs 65a of a spider 65 which is rotatably mounted on the output shaft 35 by means of a ball bearing 64. The legs 65a are disposed between bosses 10a (FIG. 7) projecting radially outwardly from the outer peripheral surface of the cylinder block 10 and guiding the motor plungers 32, respectively, therein.

Figure 13:
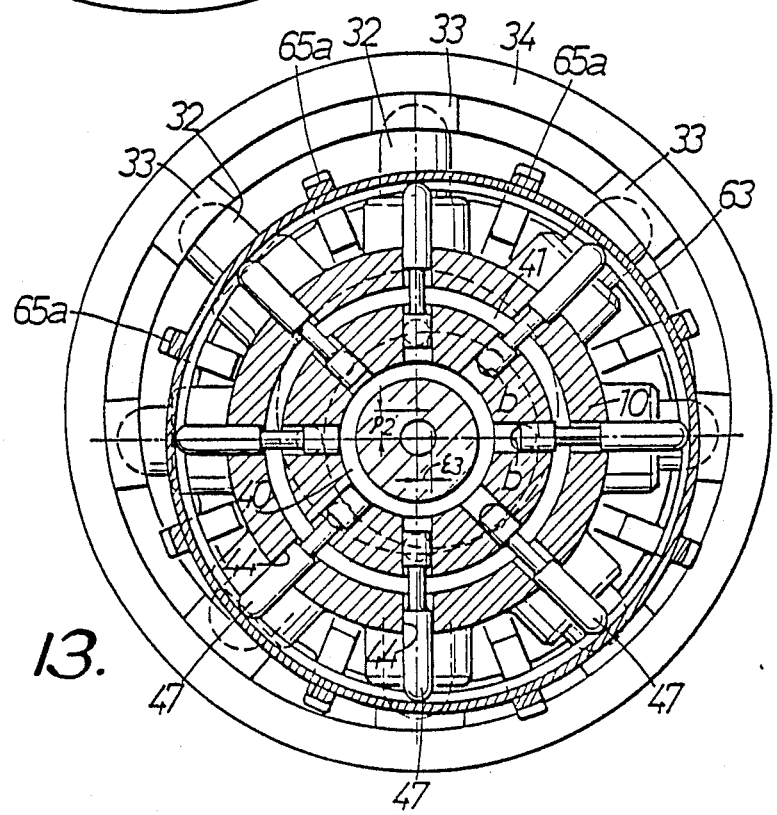
FIG. 13 is a cross-sectional view taken along line XIII—XIII of FIG. 2.

The third valve control ring 63 is held by the spider 65 in a position which is displaced $\epsilon 3$ (FIG. 13) from the center of rotation of the cylinder block 10 in a direction that is angularly spaced about 90° from the direction in which the eccentric motor ring 34 is eccentrically displaced.

When the cylinder block 10 and the output shaft 35 are relatively rotated, the second distribution valves 47 are enabled by the third valve control ring 63 to reciprocally move between radially inner and outer positions within the cylinder block 10. While the second distribution valves 47 are being moved near their inner positions, they allow communication between the pump ports b corresponding to the motor plungers 32 in the expansion stroke and the outer oil chamber 41 for thereby introducing working oil from the outer oil chamber 41 into the cylinder holes 31 housing these motor plungers 32. While the first distribution valves 47 are being moved near their outer positions, they allow communication between the motor ports b corresponding to the motor plungers 32 in the contraction stroke and the inner oil chamber 40 for thereby discharging working oil from the cylinder holes 31 housing these motor plungers 32 into the inner oil chamber 40.

The closed hydraulic circuit of the aforesaid structure is established between the hydraulic pump P and the hydraulic motor M.

In FIG. 3, the input shaft 2 has a main oil passage 70 defined centrally axially therethrough and supplied with oil stored in an oil tank 71 by a replenisher pump 72. The replenisher pump 72, which is mounted on the casing C, is actuatable by the input shaft 2 through a gear 73.

Figure 5:
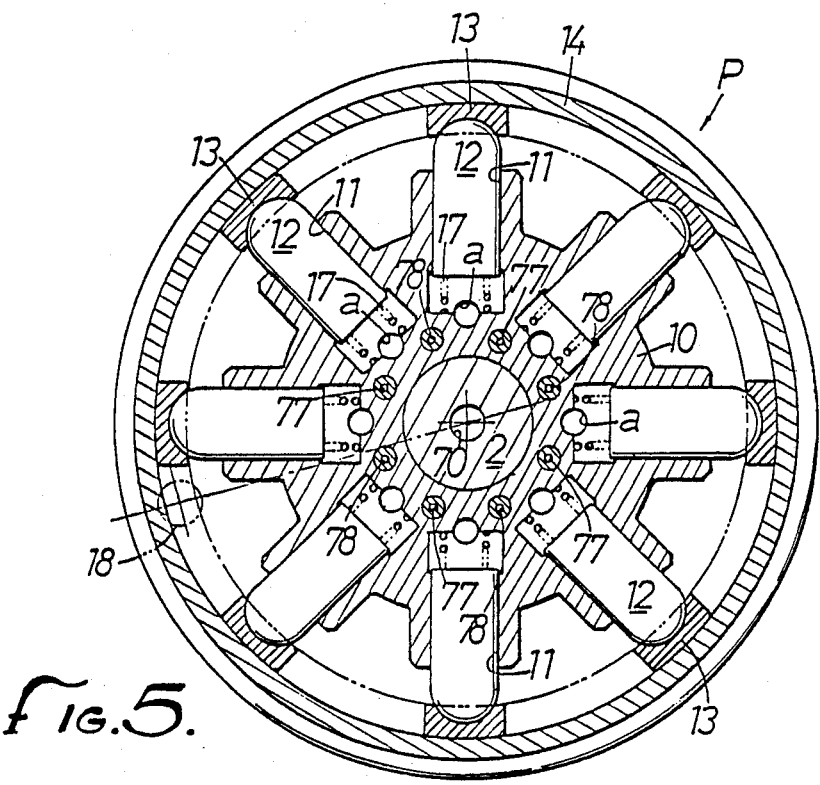
FIG. 5 is a view similar to FIG. 4, showing the parts position in which the displacement of a hydraulic pump is zero.

The main oil passage 70 has an inlet portion (on the righthand side in FIG. 3) in which an oil filter 74 is mounted. As shown in FIG. 2, the main oil passage 70 is held, at its portion downstream of the oil filter 74, in communication with the inner oil chamber 40 through a plurality of first replenishing oil passages 75, and also with the outer oil chamber 41 through a plurality of second replenishing oil passages 76. First check valves 77 are disposed respectively in the first replenishing oil passages 75 for allowing an oil flow only from the main oil passage 70 into the inner oil chamber 40. Second check valves 78 are disposed respectively in the second replenishing oil passages 76 for allowing an oil flow only from the main oil passage 70 into the outer oil chamber 41 (see also FIGS. 4 and 5).

Operation of the hydrostatically operated continuously variable transmission thus constructed is as follows:

Now, the eccentric pump ring 14 is held in the position eccentrically displaced $p1$ with respect to the cylinder block 10 and the first valve control ring 48 is held in the hydraulic pressure transmitting position m (therefore, the second valve control ring 49 is held in the clutch-on position n). The engine E is operated to enable the input shaft 2 to rotate the cylinder block 10. In the hydraulic pump P, working oil is fed under pressure from the cylinder holes 11 housing the pump plungers 12 in the discharge stroke via the pump ports a into the outer oil chamber 41, whereas the pump plungers 12 in the suction stroke draw working oil from the inner oil chamber 40 via the pump ports a into the cylinder holes 11 housing these pump plungers 12.

The working oil supplied under pressure into the outer oil chamber 41 is delivered through the motor ports b into the cylinder holes 31 housing the motor plungers 32 in the expansion stroke of the hydraulic motor M. Working oil in the cylinder holes 31 housing the motor plungers 32 in the contraction stroke is discharged through the motor ports b into the inner oil chamber 40.

During this operation, the sum of the torque which is applied through the motor plungers 32 to the eccentric motor ring 34 by the cylinder block 10 and the torque which is imparted to the eccentric motor ring 34 by the motor plungers 32 in the expansion stroke acts as a reactive torque to the output shaft 35 to rotate the same. This torque is then transmitted through the speed reducer gear shaft 4 to the differential Df.

The transmission ratio, indicated by $\pi$, can be expressed as follows:

$$\pi = \frac{Ni}{No} = \frac{1}{1 - \frac{VP}{VM}}$$

where
VP: the displacement of the hydraulic pump P
VM: the displacement of the hydraulic motor M
Ni: the speed of rotation of the input shaft 2
No: the speed of rotation of the output shaft 35.

The transmission ratio $\pi$ can freely be controlled by varying the displacement of the hydraulic pump P by controlling the amount of eccentricity $\rho 1$ of the eccentric pump ring 14 through rocking movement of the transmission ratio control ring 16, as described above.

More specifically, when VP<0, then $\pi$<1, i.e., Ni<No, resulting in a mode of deceleration, and when VP>0, then $\pi$>1, i.e., Ni>No, resulting in a mode of acceleration. When VP=0, then $\pi \approx 1$, i.e., Ni≈No, so that the input and output shafts 2, 35 are directly coupled. When VP=VM, then Ni=0 regardless of No, with the result that the transmission is in a neutral mode.

Even with the input and output shafts 2, 35 being directly coupled to each other, the transmission efficiency is inevitably lowered due to an unavoidable leakage of oil from such mutually sliding surfaces subjected to high oil pressure as the surfaces of the plungers 12, 32 and the cylinder holes 11, 31, and the valves 45, 46, 47 and the valve holes 42, 43, 44. Moreover, the condition in which the input and output shafts 2, 35 are directly coupled to each other frequently occurs during operation of automobiles. Under this condition, therefore, the first valve control ring 48 is shifted into the lockup position 1 shown in FIG. 10 for closing all of the pump ports a with the first distribution valves 45. The oil passageway between the hydraulic pump P and the hyraulic motor M is thus shut off, resulting in less sliding surfaces subjected to high oil pressure, so that any reduction in the transmission efficiency due to oil leakage is minimized.

Figure 12:
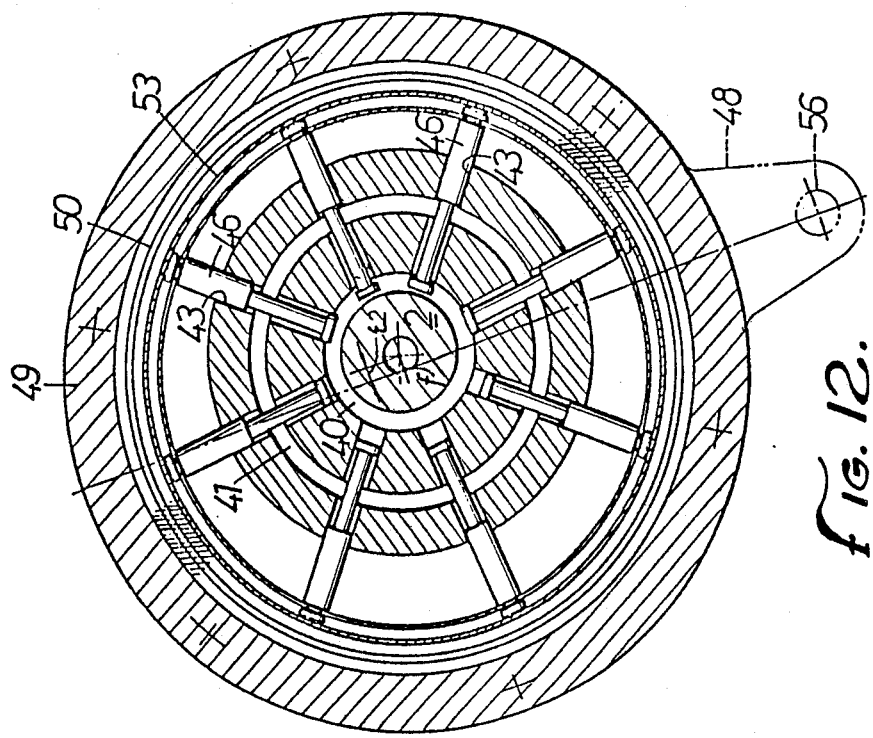
FIG. 12 is a cross-sectional view showing the group of clutch valves when the second valve control ring is in a clutch-off position.

By shifting the second valve control ring 49 into the clutch-off position shown in FIG. 12 during hydraulic pressure transmitting operation, the clutch valves 46 are moved into the radially inner position in the cylinder block 10 to provide communication between the inner and outer oil chambers 40, 41. Consequently, high-pressure working oil discharged from the hydraulic pump P into the outer oil chamber 41 is immediately drained into the inner oil chamber 40 which is of lower pressure. Thus, a clutch-off condition in which the hydraulic pressure transmission from the hydraulic pump P to the hydraulic motor M is shut off is achieved.

Working oil leakage along the various sliding surfaces from the closed hydraulic circuit between the hydraulic pump P and the hydraulic motor M during hydraulic pressure transmitting operation is compensated for as follows:

In a normal power output mode of operation in which the hydraulic motor M is hydraulically driven by the hydraulic pump P, the outer oil chamber 41 is of higher pressure and the inner oil chamber 40 is of lower pressure. Therefore, when the oil pressure in the inner oil chamber 40 falls below the oil pressure discharged from the replenisher pump 72 due to an oil leakage, the first check valves 77 are opened to allow oil supplied from the replenisher pump 72 to the main oil passage 70 to be fed into the inner oil chamber 40 through the first replenishing oil passages 75. During this time, the second check valves 78 remain closed by the higher oil pressure in the outer oil chamber 41, thus closing the second replenishing oil passages 76.

Conversely, during an engine braking mode in which the hydraulic pump P is hydraulically driven by the hydraulic motor M, the inner oil chamber 40 is of higher pressure and the outer oil chamber 41 is of lower pressure. Therefore, when the oil pressure in the outer oil chamber 41 falls below the oil pressure discharged from the replenisher pump 72 due to an oil leakage, the second check valves 78 are opened to supply oil from the main oil passage 70 via the second replenishing oil passages 76 into the outer oil chamber 41. During this time, the first check valves 77 remain closed by the higher oil pressure in the inner oil chamber 40, thus closing the first replenishing oil passages 75.

In the continuously variable transmission T of the above construction, the pump plungers 12 and the motor plungers 32 are radially arranged, and hence the cylinder block 10 which accommodates these radial pump and motor plungers 12, 32 is of a much smaller axial length than those of the cylinder blocks of conventional hydrostatically operated continuously variable transmissions. The eccentric pump and motor rings 14, 34 which impart reciprocating movement to the plungers 12, 32 are disposed in surrounding relation to the cylinder block 10. Therefore, even where end areas or surfaces of the eccentric rings 14, 34 are positioned adjacent to the end surfaces of the cylinder block 10 for the purpose of supporting the eccentric rings 14, 34, such adjacent areas or end surfaces are highly limited or minimized. For the above reasons, the continuously variable transmission T is compact especially in its axial direction.

The continuously variable transmission T may be modified such that the input and output shafts are switched around and the hydraulic pump P is used as a hydraulic motor and the hydraulic motor M as a hydraulic pump. The eccentric motor ring 34 may be arranged such that its amount of eccentricity is variable, or both of the eccentric pump and motor rings 14, 34 may be arranged such that their amount of eccentricity is variable.

Although a certain preferred embodiment has been shown and described, it should be understood that many changes and modifications may be made therein without departing from the scope of the appended claims.

What is claimed is:

1. A hydrostatically operated continuously variable transmission comprising:
    a fixed casing;
    an input shaft rotatably supported in said casing;
    a hydraulic pump coupled to said input shaft;
    an output shaft rotatably supported in said casing;
    a hydraulic motor coupled to said output shaft;
    a cylinder block rotatable with one of said input and output shafts;
    a closed hydraulic circuit disposed in said cylinder block and interconnecting said hydraulic motor and said hydraulic pump;
    one of said hydraulic pump and said hydraulic motor comprising a plurality of first plungers reciprocably disposed radially in said cylinder block, and a first eccentric ring engaging outer ends of said first plungers and supported in said casing eccentrically with respect to the center of rotation of said cylinder block for imparting reciprocating movement to said first plungers in response to rotation of said cylinder block;
    the other of said hydraulic pump and said hydraulic motor comprising a plurality of second plungers reciprocably disposed radially in said cylinder block, and a second eccentric ring engaging outer ends of said second plungers and supported relatively rotatably on the other of said input and output shafts eccentrically with respect to the center of rotation of said cylinder block for imparting reciprocating movement to said second plungers in response to relative rotation between said cylinder block and said other of the input and output shafts; and
    means for causing at least one of said first and second eccentric rings to be eccentrically displaced from said center of rotation of said cylinder block by a variable amount of eccentricity.

2. A hydrostatically operated continuously variable transmission according to claim 1, wherein said one of the hydraulic pump and the hydraulic motor is the hydraulic pump, and said first plungers comprise pump plungers.

3. A hydrostatically operated continuously variable transmission according to claim 1, wherein said cylinder block has a plurality of first cylinder holes defined radially therein, said first plungers being radially slidably fitted in said first cylinder holes, respectively, and a plurality of second cylinder holes defined radially therein and axially spaced from said first cylinder holes, said second plungers being radially slidably fitted in said second cylinder holes, respectively.

4. A hydrostatically operated continuously variable transmission according to claim 3, further comprising first springs disposed respectively in said first cylinder holes for normally urging said first plungers radially toward said first eccentric rings, and second springs disposed respectively in said second cylinder holes for normally urging said second plungers radially toward said second eccentric rings.

5. A hydrostatically operated continuously variable transmission according to claim 1, wherein said first and second eccentric rings are disposed in radially surrounding relation to said cylinder block.

6. A hydrostatically operated continuously variable transmission with an input shaft rotatably supported in a fixed casing, an output shaft rotatably supported in said casing, a hydraulic pump coupled to said input shaft, and a hydraulic motor coupled to said output shaft, comprising,
    a cylinder block rotatable with one of said input and output shafts,
    a closed hydraulic circuit disposed in said cylinder block and interconnecting said hydraulic pump and said hydraulic motor,
    one of said hydraulic pump and said hydraulic motor comprising a plurality of first plungers reciprocably disposed radially in said cylinder block, and a first eccentric ring engaging outer ends of said first plungers and supported in said casing eccentrically with respect to the center of rotation of said cylinder block for imparting reciprocating movement to said first plungers in response to rotation of said cylinder block,
    the other of said hydraulic pump and said hydraulic motor comprising a plurality of second plungers reciprocally disposed radially in said cylinder block, and a second eccentric ring engaging outer ends of said second plungers and supported relatively rotatably on the other of said input and output shafts eccentrically with respect to the center of rotation of said cylinder block for imparting reciprocating movement to said second plungers in response to relative rotation between said cylinder block and said other of the input and output shafts, and
    at least one of said first and second eccentric rings being eccentrically displaced from said center of rotation of said cylinder block by a variable amount of eccentricity.

7. A transmission according to claim 6, further comprising pivot shaft means for rockably supporting said first eccentric ring in said casing and positioning means for variably positioning said first eccentric ring in cooperation with said pivot shaft means.

8. A transmission according to claim 7, wherein said positioning means varies the variable amount of eccentricity.

9. A transmission according to claim 7, wherein said positioning means comprises a sector gear coupled to said first eccentric ring, and worn gear means supported on said casing for engaging said sector gear.

10. A hydrostatically operated continuously variable transmission according to claim 3, further comprising pivot shaft means for rockably supporting said first eccentric ring in said casing and positioning means for variably positioning said first eccentric ring in cooperation with said pivot shaft means.

11. A hydrostatically operated continuously variable transmission according to claim 5, further comprising pivot shaft means for rockably supporting said first eccentric ring in said casing and positioning means for variably positioning said first eccentric ring in cooperation with said pivot shaft means.

* * * * *